(12) United States Patent
Kim et al.

(10) Patent No.: US 9,488,889 B2
(45) Date of Patent: Nov. 8, 2016

(54) LIQUID CRYSTAL DISPLAY AND A METHOD OF MANUFACTURING THE SAME

(71) Applicant: SAMSUNG DISPLAY CO., LTD., Gyeonggi-do (KR)

(72) Inventors: Dongjo Kim, Gyeonggi-do (KR); Yoonho Khang, Gyeonggi-do (KR); Sehwan Yu, Seoul (KR); Jungkyu Lee, Seoul (KR); Jong chan Lee, Gyeonggi-do (KR); Jiseon Lee, Gyeonggi-do (KR); Sanggab Kim, Seoul (KR); Shin Il Choi, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 133 days.

(21) Appl. No.: 13/940,588

(22) Filed: Jul. 12, 2013

(65) Prior Publication Data
US 2014/0204323 A1     Jul. 24, 2014

(30) Foreign Application Priority Data
Jan. 21, 2013   (KR) .................. 10-2013-0006613

(51) Int. Cl.
*G02F 1/136* (2006.01)
*G02F 1/1362* (2006.01)

(52) U.S. Cl.
CPC ............ *G02F 1/136227* (2013.01); *G02F 2001/13629* (2013.01); *G02F 2201/123* (2013.01)

(58) Field of Classification Search
CPC ........... G02F 1/1368; G02F 1/136227; G02F 2001/13629; G02F 2201/123

USPC .......................................................... 349/43
See application file for complete search history.

(56) References Cited

U.S. PATENT DOCUMENTS

| | | | | |
|---|---|---|---|---|
| 5,194,976 A | * | 3/1993 | Nakano et al. | 349/138 |
| 5,847,410 A | * | 12/1998 | Nakajima | 257/59 |
| 7,518,675 B2 | * | 4/2009 | Tanaka | 349/113 |
| 8,208,111 B2 | | 6/2012 | Ha et al. | |
| 2002/0109797 A1 | * | 8/2002 | Chung et al. | 349/43 |
| 2004/0000864 A1 | * | 1/2004 | Kato | 313/504 |
| 2005/0041192 A1 | * | 2/2005 | Kuo et al. | 349/152 |
| 2007/0064185 A1 | * | 3/2007 | Kim | G02F 1/1333 349/114 |

(Continued)

FOREIGN PATENT DOCUMENTS

| | | |
|---|---|---|
| JP | 2007-086803 | 4/2007 |
| JP | 2007-232785 | 9/2007 |

(Continued)

*Primary Examiner* — Nathanael R Briggs
*Assistant Examiner* — William Peterson
(74) *Attorney, Agent, or Firm* — F. Chau & Associates, LLC

(57) ABSTRACT

A liquid crystal display includes a first substrate including a plurality of pixels, a second substrate facing the first substrate, and a liquid crystal layer interposed between the first substrate and the second substrate. At least one of the pixels includes a thin film transistor disposed on a first insulating substrate, an insulating layer overlapping the thin film transistor, and a pixel electrode disposed on the insulating layer. A contact hole is formed through the insulating layer to expose a first electrode of the thin film transistor, the pixel electrode is electrically connected to the first electrode through the contact hole, and the pixel electrode has a single-layer in an area where the contact hole is formed and a double-layer on the insulating layer.

21 Claims, 16 Drawing Sheets

(56) References Cited

U.S. PATENT DOCUMENTS

2007/0195213 A1* 8/2007 Oh .................................. 349/38
2011/0201141 A1* 8/2011 Yamazaki et al. .............. 438/28
2012/0057115 A1   3/2012 Kunimatsu et al.

FOREIGN PATENT DOCUMENTS

| JP | 2012-145797 | 8/2012 |
|----|-------------|--------|
| KR | 100268303 | 7/2000 |
| KR | 1020110071313 | 6/2011 |

* cited by examiner

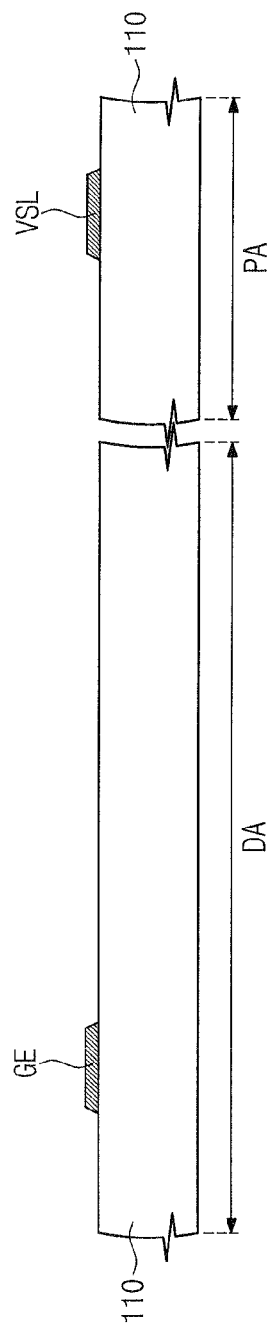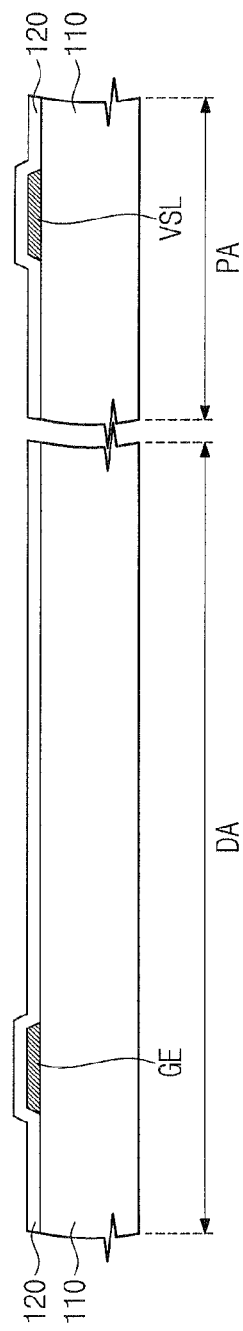

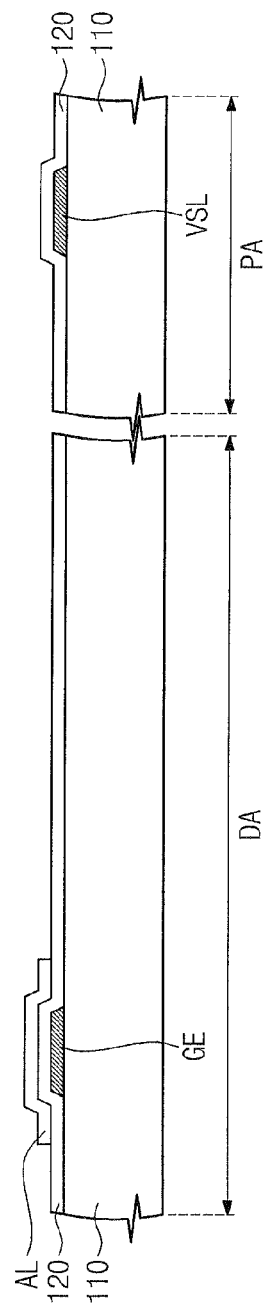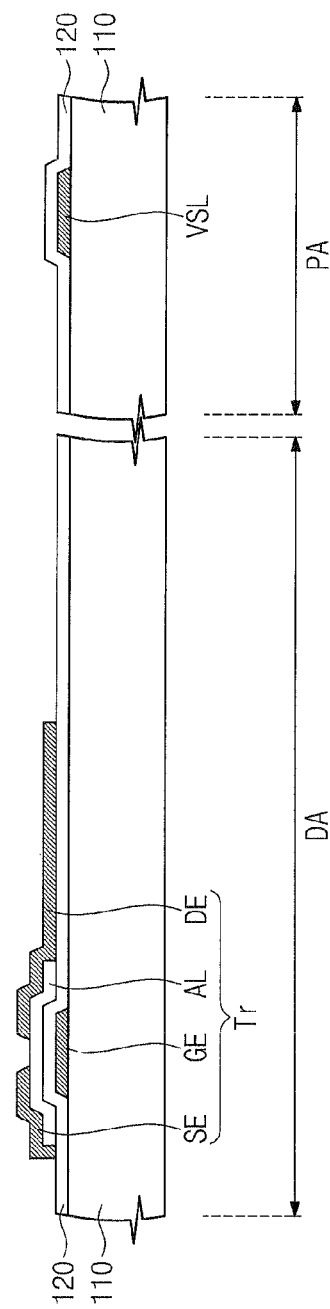

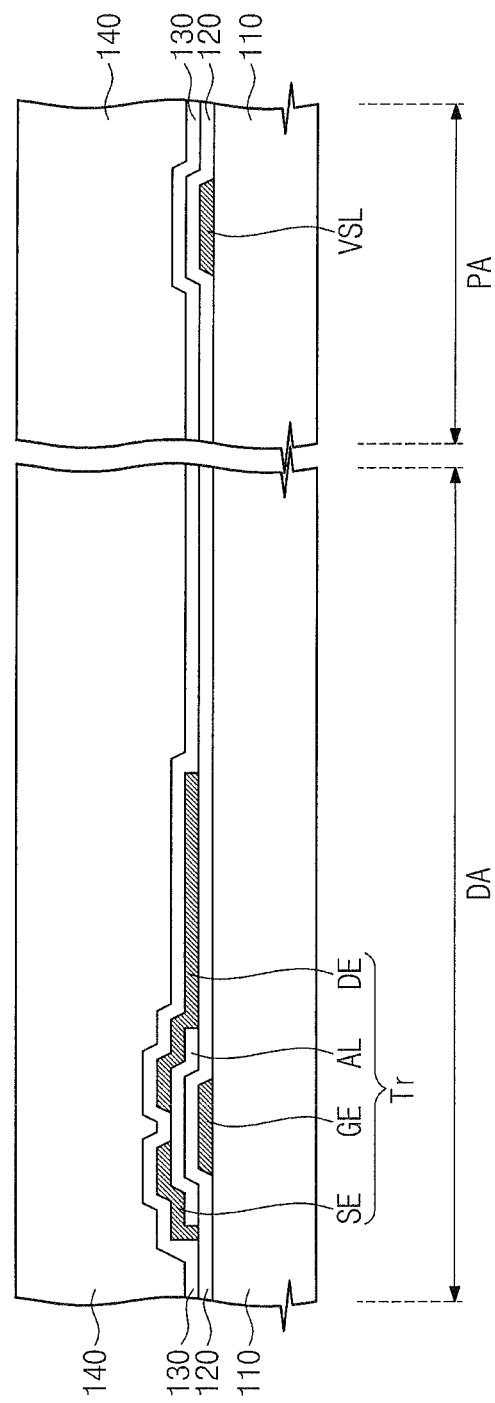

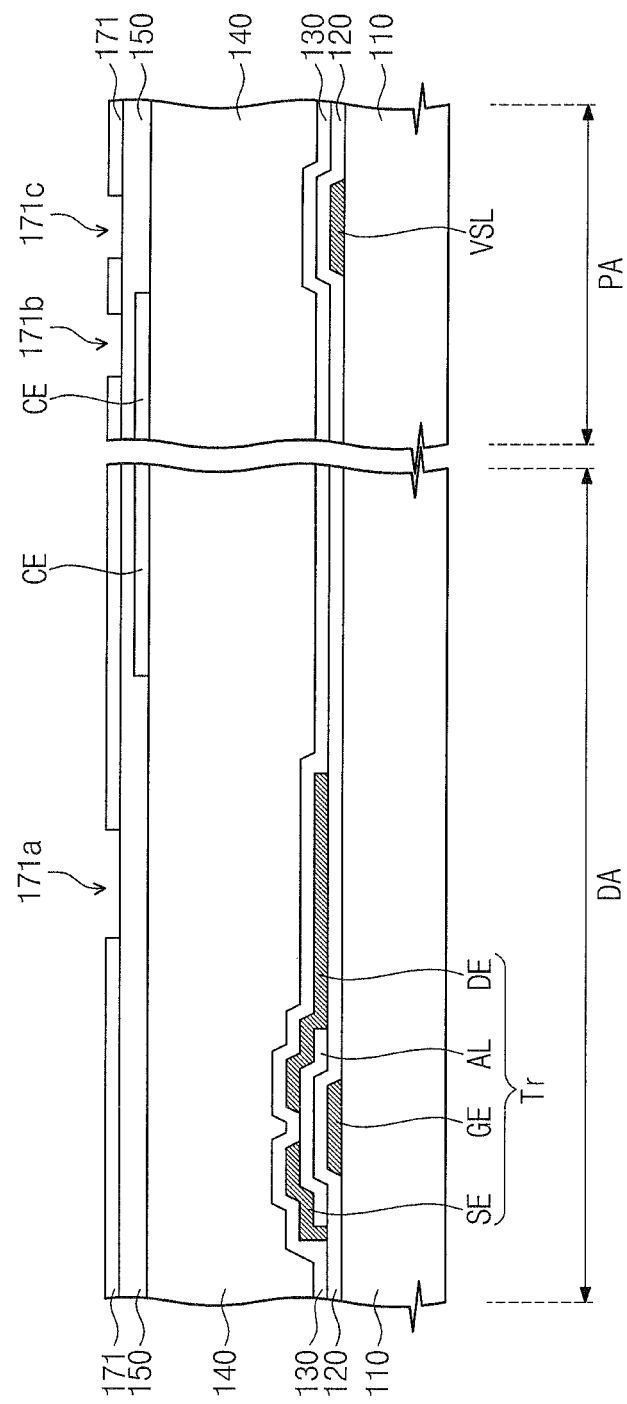

LIQUID CRYSTAL DISPLAY AND A METHOD OF MANUFACTURING THE SAME

CROSS-REFERENCE TO RELATED APPLICATION

This U.S. non-provisional patent application claims priority under 35 U.S.C. §119 to Korean Patent Application No. 10-2013-0006613, filed on Jan. 21, 2013, the disclosure of which is incorporated by reference herein in its entirety.

BACKGROUND

1. Technical Field

The present invention relates to a liquid crystal display and a method of manufacturing the same. More particularly, the present invention relates to a liquid crystal display capable of improving an aperture ratio and a method of manufacturing the liquid crystal display.

2. Discussion of the Related Art

A liquid crystal display is a flat panel display that can display an image using a liquid crystal layer. The liquid crystal display may be classified as an in-plane switching (IPS) mode liquid crystal display, a vertical alignment (VA) mode liquid crystal display, and a plane-to-line switching (PLS) mode liquid crystal display according to a method of driving the liquid crystal layer.

In other words, the liquid crystal display drives the liquid crystal layer using a horizontal electric field or a vertical electric field, which is formed between two electrodes. In the PLS mode, liquid crystal molecules of the liquid crystal layer are rotated in a direction parallel to a substrate by a strong fringe electric field between the electrodes.

SUMMARY

An exemplary embodiment of the present invention provides a liquid crystal display capable of reducing a size of a contact hole to improve an aperture ratio thereof.

An exemplary embodiment of the present invention provides a method of manufacturing the liquid crystal display.

An exemplary embodiment of the present invention provides a liquid crystal display including a first substrate including a plurality of pixels, a second substrate facing the first substrate, and a liquid crystal layer interposed between the first substrate and the second substrate. At least one of the pixels includes a thin film transistor disposed on a first insulating substrate, an insulating layer overlapping the thin film transistor, and a pixel electrode disposed on the insulating layer. A contact hole is formed through the insulating layer to expose a first electrode of the thin film transistor, the pixel electrode is electrically connected to the first electrode through the contact hole, and the pixel electrode has a single-layer in an area where the contact hole is formed and a double-layer on the insulating layer.

The pixel electrode further includes a first pixel electrode including an opening in an area where the contact hole is formed and a second pixel electrode disposed on the first pixel electrode and electrically connected to the first electrode through the contact hole.

The first and second pixel electrodes include a transparent conductive material.

The insulating layer includes an organic insulating layer.

The insulating layer includes a color filter.

An exemplary embodiment of the present invention provides a liquid crystal display including a first substrate including a plurality of pixels, a second substrate facing the first substrate, and a liquid crystal layer interposed between the first substrate and the second substrate. At least one of the pixels includes a thin film transistor disposed on a first insulating substrate, a first protection layer overlapping the thin film transistor, an insulating layer disposed on the first protection layer, a reference electrode disposed on the insulating layer, a second protection layer overlapping the reference electrode, and a pixel electrode disposed on the second protection layer. A contact hole is formed through the first protection layer, the insulating layer, and the second protection layer to expose a first electrode of the thin film transistor. The pixel electrode is electrically connected to the first electrode through the contact hole, and the pixel electrode has a single-layer in an area where the contact hole is formed and a double-layer on the second protection layer.

The pixel electrode further includes a first pixel electrode including an opening in an area where the contact hole is formed and a second pixel electrode disposed on the first pixel electrode and electrically connected to the first electrode through the contact hole.

The first and second pixel electrodes include a transparent conductive material.

The reference electrode is configured to receive a reference voltage.

An exemplary embodiment of the present invention provides a method of manufacturing a liquid crystal display including foaming a first substrate. The forming of the first substrate includes forming a thin film transistor on a first insulating substrate, forming an insulating layer over the thin film transistor, forming a first pixel electrode with an opening on the insulating layer, etching the insulating layer using the first pixel electrode as a mask to form a contact hole corresponding to the opening, and forming a second pixel electrode on the first pixel electrode, wherein the second pixel electrode is electrically connected to an electrode of the thin film transistor through the contact hole.

The contact hole is formed through a dry-etching process.

The first and second pixel electrodes include a transparent conductive material.

The insulating layer includes an organic insulating layer.

The method of manufacturing the liquid crystal display further includes forming a second substrate facing the first substrate and forming a liquid crystal layer between the first and second substrates.

An exemplary embodiment of the present invention provides a method of manufacturing a liquid crystal display including forming a first substrate. The forming of the first substrate includes forming a thin film transistor on a first insulating substrate, forming a first protection layer over the thin film transistor, forming an insulating layer on the first protection layer, forming a reference electrode on the insulating layer, forming a second protection layer over the reference electrode, forming a first pixel electrode with an opening on the second protection layer, etching the second protection layer, the insulating layer, and the first protection layer using the first pixel electrode as a mask to form a contact hole through an area corresponding to the opening, and forming a second pixel electrode on the first pixel electrode, wherein the second pixel electrode is electrically connected to an electrode of the thin film transistor through the contact hole.

The contact hole is formed through a dry-etching process.

The first and second pixel electrodes include a transparent conductive material.

The insulating layer includes an organic insulating layer.

The method of manufacturing the liquid crystal display further includes forming a second substrate facing the first substrate and forming a liquid crystal layer between the first and second substrates.

An exemplary embodiment of the present invention provides a liquid crystal display that includes a substrate, a transistor disposed on the substrate, an insulating layer disposed on the transistor and a pixel electrode disposed on the insulating layer, wherein the pixel electrode has two layers on the insulating layer and one layer on an electrode of the transistor.

BRIEF DESCRIPTION OF THE DRAWINGS

The above and other features of the present invention will become more apparent by describing in detail exemplary embodiments thereof with reference to the accompanying drawings wherein:

FIGS. 6A to 6K are cross-sectional views showing a manufacturing method of a first substrate, according to an exemplary embodiment of the present invention;

DETAILED DESCRIPTION OF EXEMPLARY EMBODIMENTS

Exemplary embodiments of the present invention will be described more fully hereinafter with reference to the accompanying drawings. The present invention may, however, be embodied in many different forms and should not be construed as limited to the embodiments set forth herein.

It will be understood that when an element or layer is referred to as being "on," "connected to" or "coupled to" another element or layer, it can be directly on, connected or coupled to the other element or layer or intervening elements or layers may be present. Like numbers may refer to like elements throughout the specification and drawings.

As used herein, the singular forms, "a," "an" and "the" are intended to include the plural forms as well, unless the context clearly indicates otherwise.

Figure 1:
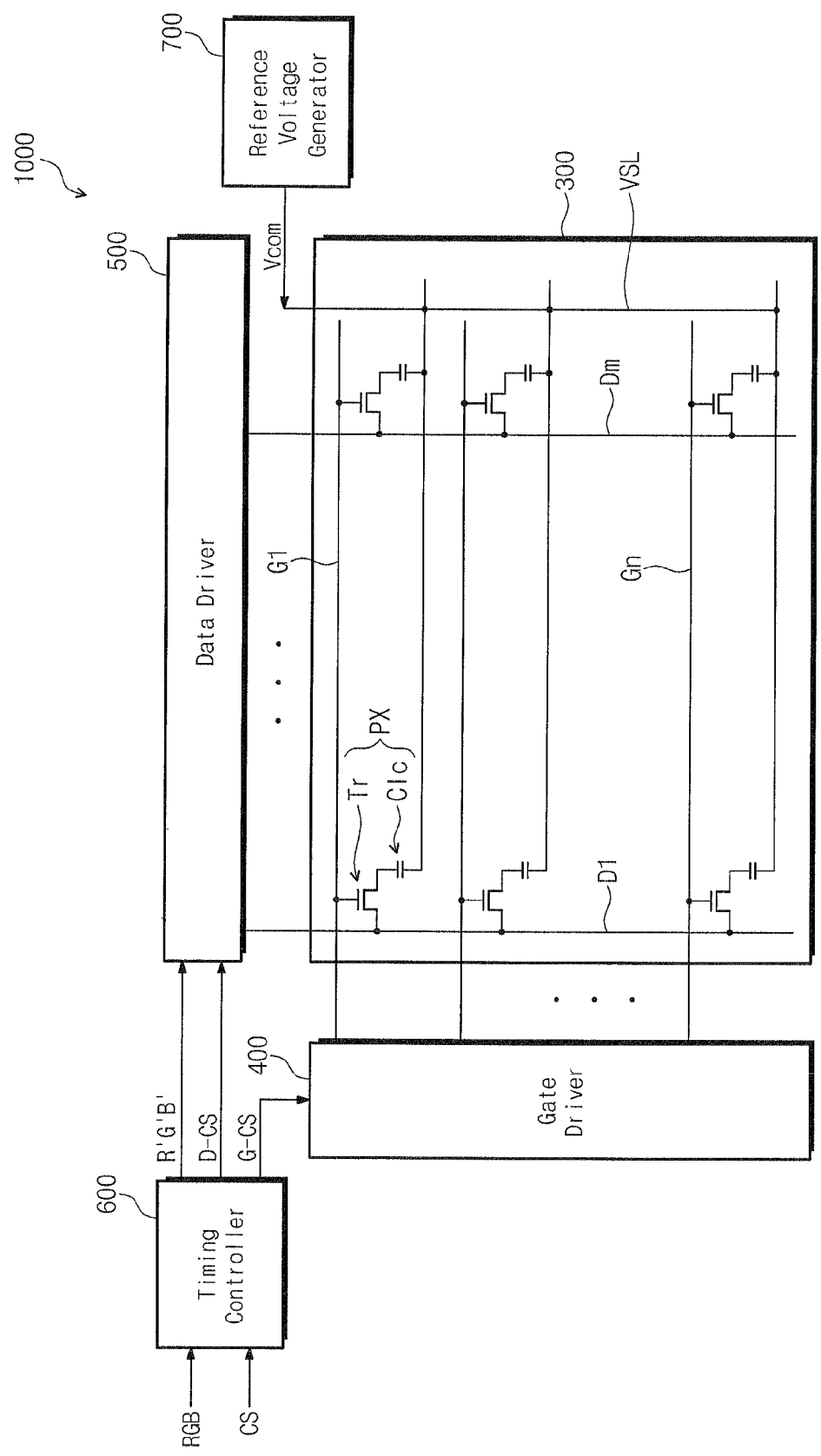
FIG. 1 is a block diagram showing a liquid crystal display according to an exemplary embodiment of the present invention.
Figure 2:
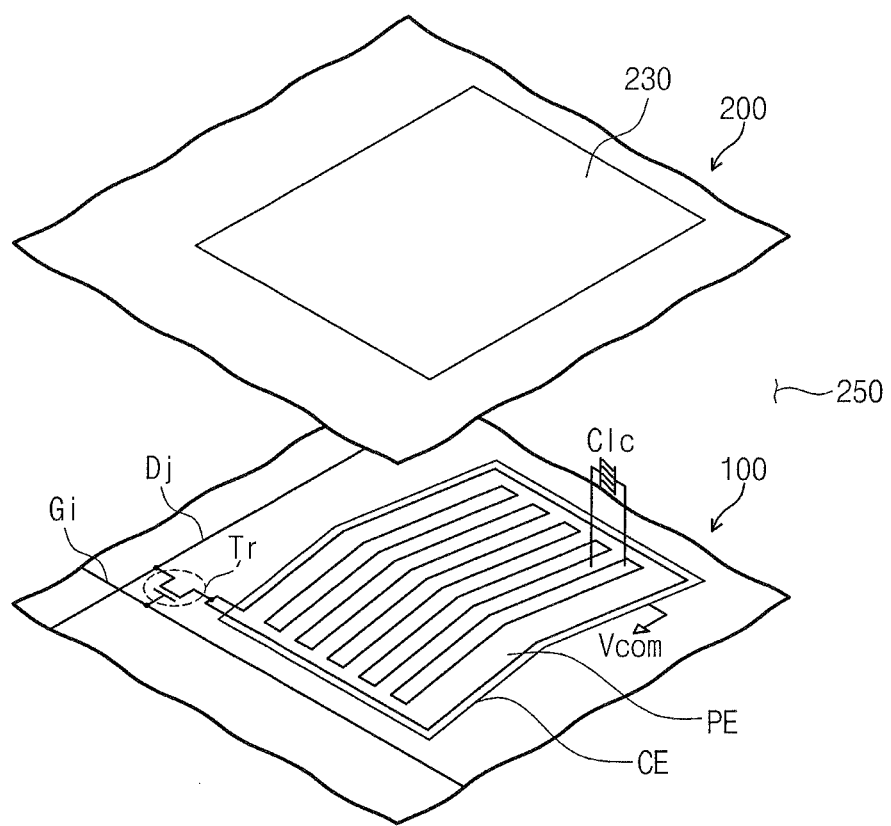
FIG. 2 is an equivalent circuit diagram showing a pixel of FIG. 1, according to an exemplary embodiment of the present invention.

FIG. 1 is a block diagram showing a liquid crystal display according to an exemplary embodiment of the present invention, and FIG. 2 is an equivalent circuit diagram showing a pixel of FIG. 1, according to an exemplary embodiment of the present invention. FIG. 2 shows the equivalent circuit diagram of the pixel of a plane-to-line switching (PLS) mode liquid crystal display as an example. Other liquid crystal display mode types such as vertical alignment and in-plane switching may be used with the present invention.

Referring to FIG. 1, a liquid crystal display 1000 includes an image display part 300 on which an image is displayed, a gate driver 400 and a data driver 500, which drive the image display part 300, and a timing controller 600 that controls an operation of the gate driver 400 and the data driver 500.

The image display part 300 includes a plurality of gate lines G1 to Gn, a plurality of data lines D1 to Dm, and a plurality of pixels PX. As shown in FIG. 2, the image display part 300 includes a liquid crystal display panel, and the liquid crystal display panel includes a first substrate 100, a second substrate 200 facing the first substrate 100, and a liquid crystal layer 250 interposed between the first substrate 100 and the second substrate 200.

The gate lines G1 to Gn and the data lines D1 to Dm are arranged on the first substrate 100. The gate lines G1 to Gn are extended in a row direction and arranged in a column direction to be substantially parallel to each other. The data lines D1 to Dm are extended in the column direction and arranged in the row direction to be substantially parallel to each other.

Each of the pixels PX, e.g., a pixel connected to an i-th gate line Gi ('i' is an integer equal to or greater than 1) and a j-th data line Dj ('j' is an integer equal to or greater than 1), includes a thin film transistor Tr and a liquid crystal capacitor Clc.

The thin film transistor Tr includes a gate electrode connected to the i-th gate line Gi, a source electrode connected to the j-th data line Dj, and a drain electrode connected to the liquid crystal capacitor Clc.

The liquid crystal capacitor Clc includes a portion of a pixel electrode PE and a portion of a reference electrode CE, which are disposed on the first substrate 100, as its two terminals, and the liquid crystal layer 250 interposed between the first substrate 100 and the second substrate 200 serves as a dielectric. The pixel electrode PE is electrically connected to the drain electrode of the thin film transistor Tr, and the reference electrode CE receives a reference voltage Vcom from a reference voltage generator 700. The reference electrode CE may be a common electrode and the reference voltage Vcom may be a common voltage.

In addition, each pixel PX includes a color filter 230 disposed on an area of the second substrate 200, which corresponds to the pixel electrode PE, to display one of the primary colors of red, green, and blue. However, a position of the color filter 230 should not be limited thereto or thereby. In other words, the color filter 230 may be formed on or under the pixel electrode PE of the first substrate 100.

Referring to FIG. 1 again, the timing controller 600 receives a plurality of image signals RGB (red, green, blue) and a plurality of control signals CS from an external source (not shown) of the liquid crystal display 1000. The image signals may correspond to other color schemes, e.g., CMYK (cyan, magenta, yellow and black). The timing controller 600 converts a data format of the image signals RGB to a data format appropriate for an interface between the data driver 500 and the timing controller 600 and provides the converted image signals R'G'B' to the data driver 500. In addition, the timing controller 600 generates a data signal D-CS, e.g., an output start signal, a horizontal start signal, etc., and a gate control signal G-CS, e.g., a vertical start signal, a vertical clock signal, a vertical clock bar signal, etc., based on the control signals CS. The data control signal D-CS is applied to the data driver 500, and the gate control signal G-CS is applied to the gate driver 400.

The gate driver 400 sequentially outputs a gate signal in response to the gate control signal G-CS provided from the timing controller 600. Thus, the pixels PX are sequentially scanned by the gate signal in row units.

The data driver 500 converts the image signals R'G'B' to data voltages in response to the data control signal D-CS provided from the timing controller 600 and outputs the data voltages. The data voltages are applied to the image display part 300 via the data lines D1 to Dm.

Therefore, each pixel PX is turned on in response to the gate signal, and the turned-on pixel PX receives a corresponding data voltage of the data voltages from the data driver 500 to display an image having a desired gray-scale.

Figure 3:
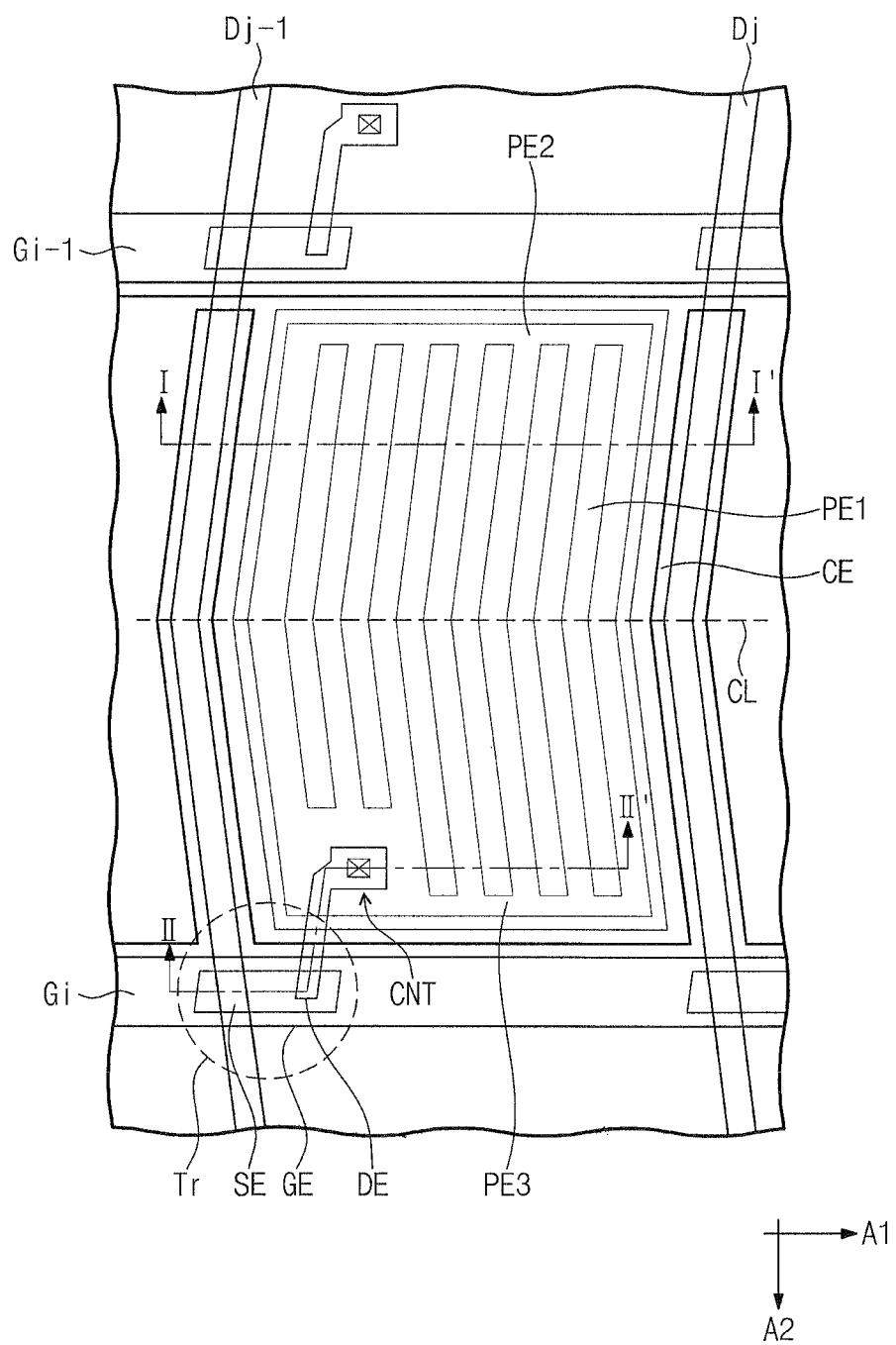
FIG. 3 is a plan view showing a plane-to-line switching (PLS) mode liquid crystal display panel according to an exemplary embodiment of the present invention.
Figure 4:
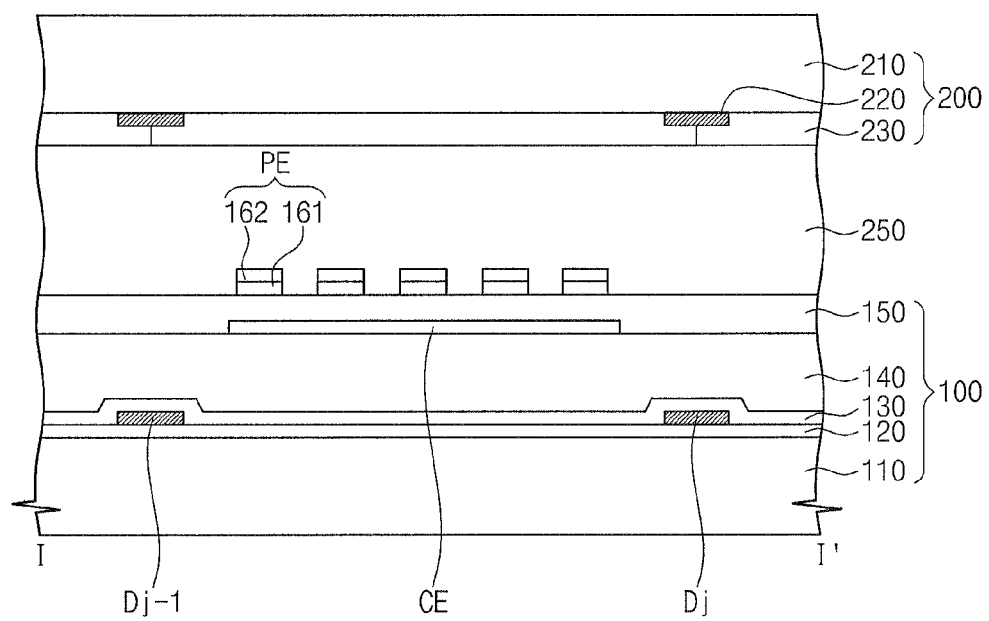
FIG. 4 is a cross-sectional view taken along line I-I' of FIG. 3.

FIG. 3 is a plan view showing the PLS mode liquid crystal display panel according to an exemplary embodiment of the present invention, and FIG. 4 is a cross-sectional view taken along line I-I' of FIG. 3.

Referring to FIGS. 3 and 4, the liquid crystal display panel of the image display part 300 includes the first substrate 100, the second substrate 200 facing the first substrate 100, and the liquid crystal layer 250 interposed between the first substrate 100 and the second substrate 200.

The first substrate 100 includes a first insulating substrate 110 formed of a transparent glass or plastic, and a first gate line Gi-1, a second gate line Gi, a first data line Dj-1, and a second data line Dj, which are arranged on the first insulating substrate 110.

The first and second gate lines Gi-1 and Gi are extended in a first direction A1 and arranged in a second direction A2 that is substantially perpendicular to the first direction A1 while being spaced apart from each other by a predetermined distance in the second direction A2. The first and second data lines Dj-1 and Dj are extended in the second direction A2 and spaced apart from each other by a predetermined distance in the first direction A1.

The first and second gate lines Gi-1 and Gi are electrically insulated from the first and second data lines Dj-1 and Dj by a gate insulating layer 120. In addition, the first and second data lines Dj-1 and Dj are covered by a first protection layer 130. As an example, the first protection layer 130 includes an inorganic insulating layer. An organic insulating layer 140 is disposed on the first protection layer 130.

As shown in FIG. 3, each of the first data line Dj-1 and the second data line Dj has a symmetrical bent shape that is bent with respect to a center line CL passing through a center position between the first gate line Gi-1 and the second gate line Gi. The bent direction of each of the first and second data lines Dj-1 and Dj may be changed in an opposite direction every other row. The bent shape of the first and second data lines Dj-1 and Dj may be asymmetric. The first and second data lines Dj-1 and Dj may be straight.

Figure 5:
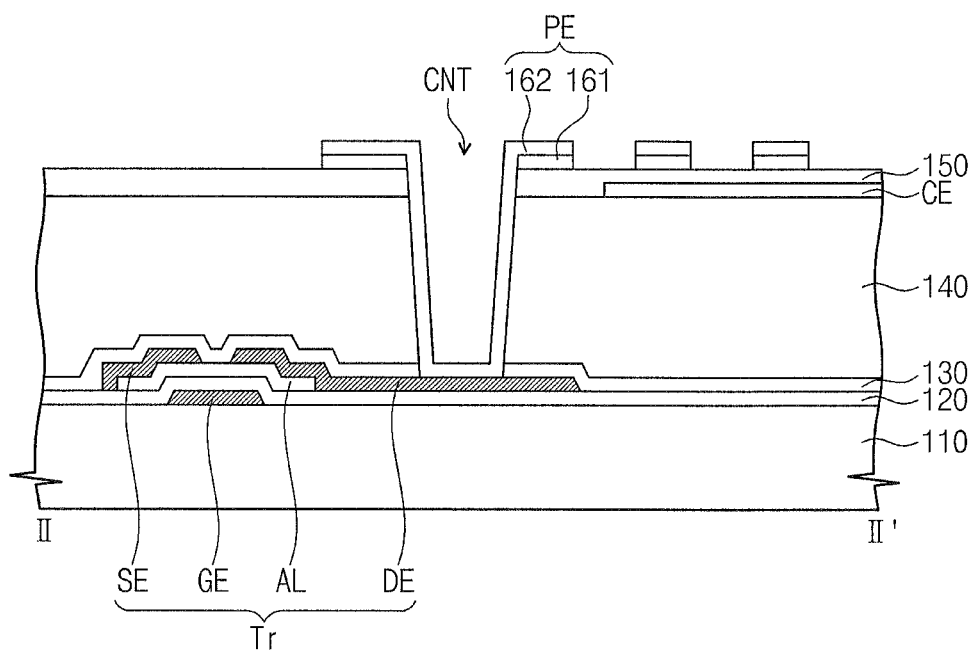
FIG. 5 is a cross-sectional view taken along line II-II' of FIG. 3.

In addition, the first insulating substrate 110 further includes the thin film transistor Tr, the pixel electrode PE, and the reference electrode CE, which are disposed thereon. In detail, the thin film transistor Tr includes the gate electrode GE corresponding to a portion of the second gate line Gi, the source electrode SE corresponding to a portion of the first data line Dj-1, and the drain electrode DE spaced apart from the source electrode SE by a predetermined distance on the gate electrode GE. The drain electrode DE is electrically connected to the pixel electrode PE. The structure of the thin film transistor Tr can be further gleaned from FIG. 5. As shown in FIG. 5, a semiconductor layer AL is also disposed on the gate electrode GE.

In the present exemplary embodiment, the pixel electrode PE includes a plurality of branch electrodes PE1, a first connection electrode PE2 connecting first ends of the branch electrodes PE1, and a second connection electrode PE3 connecting second ends of the branch electrodes PE1. The branch electrodes PE1 are extended in the second direction A2 between the first data line Dj-1 and the second data line Dj and arranged in the first direction A1. In addition, each of the branch electrodes PE1 has a symmetrical bent shape that is bent with respect to the center line CL. The branch electrodes PE1 may have an asymmetric bent shape or they may be straight.

An angle of inclination of each of the branch electrodes PE1 with respect to the center line CL is the same as an angle of inclination of the first and second data lines Dj-1 and Dj with respect to the center line CL.

The reference electrode CE is disposed on or under the pixel electrode PE, and a size of the reference electrode CE corresponds to a pixel area defined by the first and second gate lines Gi-1 and Gi and the first and second data lines Dj-1 and Dj. As shown in FIG. 4, the reference electrode CE is disposed on the organic insulating layer 140 and covered by a second protection layer 150. The pixel electrode PE is disposed on the second protection layer 150. In other words, the reference electrode CE is disposed under the pixel electrode PE to face the pixel electrode PE while the second protection layer 150 is interposed therebetween.

As shown in FIG. 3, the reference electrodes CE disposed on the same pixel row are integrally formed with each other or electrically connected to each other to form one reference pixel row. The reference pixel row is electrically connected to a reference voltage supply line VSL (shown in FIG. 1) at one side of the first substrate 100 to receive the reference voltage Vcom from the reference voltage generator 700 (shown in FIG. 1).

The second substrate 200 includes a second insulating substrate 210 formed of a transparent glass or plastic, the color filters 230 disposed on the second insulating substrate 210, and a black matrix 220 disposed between adjacent color filters 230. The second substrate 200 faces the first substrate 100 while being coupled to the first substrate 100 and the liquid crystal layer 250 is interposed between the first substrate 100 and the second substrate 200.

When the gate signal is applied to the pixel PX through the second gate line Gi, the thin film transistor Tr is turned on in response to the gate signal. The data voltage applied to the first data line Dj-1 is output through the drain electrode DE of the turned-on thin film transistor Tr and applied to the pixel electrode PE.

The pixel electrode PE applied with the data voltage generates an electric field in cooperation with the reference electrode CE applied with the reference voltage Vcom to determine an alignment direction of liquid crystal molecules of the liquid crystal layer 250, which are disposed on the pixel electrode PE and the reference electrode CE. Thus, a polarization of light transmitted through the liquid crystal layer 250 is changed according to the alignment direction of the liquid crystal molecules.

The pixel electrode PE and the reference electrode CE form the liquid crystal capacitor Clc (shown in FIG. 1) using the liquid crystal layer 250 as the dielectric to maintain the voltage applied thereto after the thin film transistor Tr is turned off.

Although not shown in figures, each pixel PX may further include a storage line that is overlapped with the pixel electrode PE. The storage line and the pixel electrode PE form a storage capacitor using the gate insulating layer 120 and the first and second protection layers 130 and 150 as a dielectric thereof to strengthen a voltage maintaining capability of the liquid crystal capacitor Clc.

As shown in FIG. 4, the pixel electrode PE has a double-layered structure above the second protection layer 150. In detail, the pixel electrode PE includes a first pixel electrode 161 disposed on the second protection layer 150 and a second pixel electrode 162 disposed on the first pixel electrode 161.

FIG. 5 is a cross-sectional view taken along line II-II' of FIG. 3. In FIG. 5, for convenience of explanation, the second substrate 200 is omitted to show only the first substrate 100 in detail.

Referring to FIG. 5, a contact hole CNT is formed through the first protection layer 130, the organic insulating layer 140, and the second protection layer 150 to expose the drain electrode DE of the thin film transistor Tr.

The pixel electrode PE is disposed on the second protection layer 150 and the drain electrode DE exposed through the contact hole CNT. In detail, the pixel electrode PE has the double-layered structure on the second protection layer 150 and has a single-layered structure on the drain electrode DE. The first pixel electrode 161, which serves as a lower electrode of the pixel electrode PE, has an open structure corresponding to the contact hole CNT. In other words, the first pixel electrode 161 is not disposed in the contact hole CNT. The second pixel electrode 162 is disposed on the first pixel electrode 161 above the second protection layer 150 and makes direct contact with the drain electrode DE exposed through the contact hole CNT in the contact hole CNT.

FIGS. 6A to 6K are cross-sectional views showing a manufacturing method of the first substrate 100, according to an exemplary embodiment of the present invention.

Referring to FIG. 6A, the first insulating substrate 110 includes a display area DA and a peripheral area PA. The display area DA is where an image is displayed, and the peripheral area PA is disposed adjacent to the display area DA and covered by the black matrix 220 of the second substrate 200, and thus the image is not displayed in the peripheral area PA.

A first metal layer is formed on the first insulating substrate 110, and the first metal layer is patterned to form the gate electrode GE, the first gate line Gi-1, and the second gate line Gi in the display area DA and form the reference voltage supply line VSL in the peripheral area PA. The first metal layer is formed of an aluminum-based metal, such as aluminum (Al), an aluminum alloy, etc., a silver-based metal, such as silver (Ag), a silver alloy, etc., a copper-based metal, such as copper (Cu), a copper alloy, etc., a molybdenum-based metal, such as molybdenum (Mo), a molybdenum alloy, etc., chromium (Cr), tantalum (Ta), titanium (Ti), etc. Although not shown in figures, the first metal layer may have a multi-layered structure of two different conductive layers, which have different physical properties.

As shown in FIG. 6B, the gate electrode GE, the first and second gate lines Gi-1 and Gi, and the reference voltage supply line VSL are covered by the gate insulating layer 120. The gate insulating layer 120 includes silicon nitride (SiNx) or silicon oxide (SiOx).

Referring to FIG. 6C, the semiconductor layer AL including a hydrogenated amorphous silicon, a polysilicon, or an oxide semiconductor material is formed on the gate insulating layer 120. The semiconductor layer AL is disposed on the gate electrode GE.

Referring to FIG. 6D, a second metal layer is formed on the gate insulating layer 120 and the semiconductor layer AL, and the second metal layer is patterned to form the source electrode SE, the drain electrode DE, and the first and second data lines Dj-1 and Dj. The second metal layer includes a refractory metal, such as molybdenum, chromium, tantalum, titanium, or a mixture thereof.

Of the first and second data lines Dj-1 and Dj, an area thereof facing the gate electrode GE is defined as the source electrode SE. In addition, the drain electrode DE is spaced apart from the source electrode SE by the predetermined distance on the gate electrode GE. Thus, the thin film transistor Tr is formed.

As shown in FIG. 6E, the thin film transistor Tr is covered by the first protection layer 130. The first protection layer 130 is formed of an inorganic insulating material, such as silicon nitride (SiNx) or silicon oxide (SiOx). In addition, the first protection layer 130 may have a single-layered structure including one of the silicon nitride (SiNx) and the silicon oxide (SiOx). According to an exemplary embodiment of the present invention, the first protection layer 130 may have a double-layered structure having an upper layer and a lower layer, which are formed of silicon nitride (SiNx) and silicon oxide (SiOx), respectively.

The organic insulating layer 140, which is formed of an acrylic resin, is disposed on the first protection layer 130. In an exemplary embodiment of the present invention, a color filter layer may be formed on the first protection layer 130 instead of the organic insulating layer 140. In the case that the color filter layer is disposed on the first protection layer 130 instead of the organic insulating layer 140, the color filter 230 disposed on the second substrate 200 as shown in FIG. 2 is omitted.

Figure 6F:
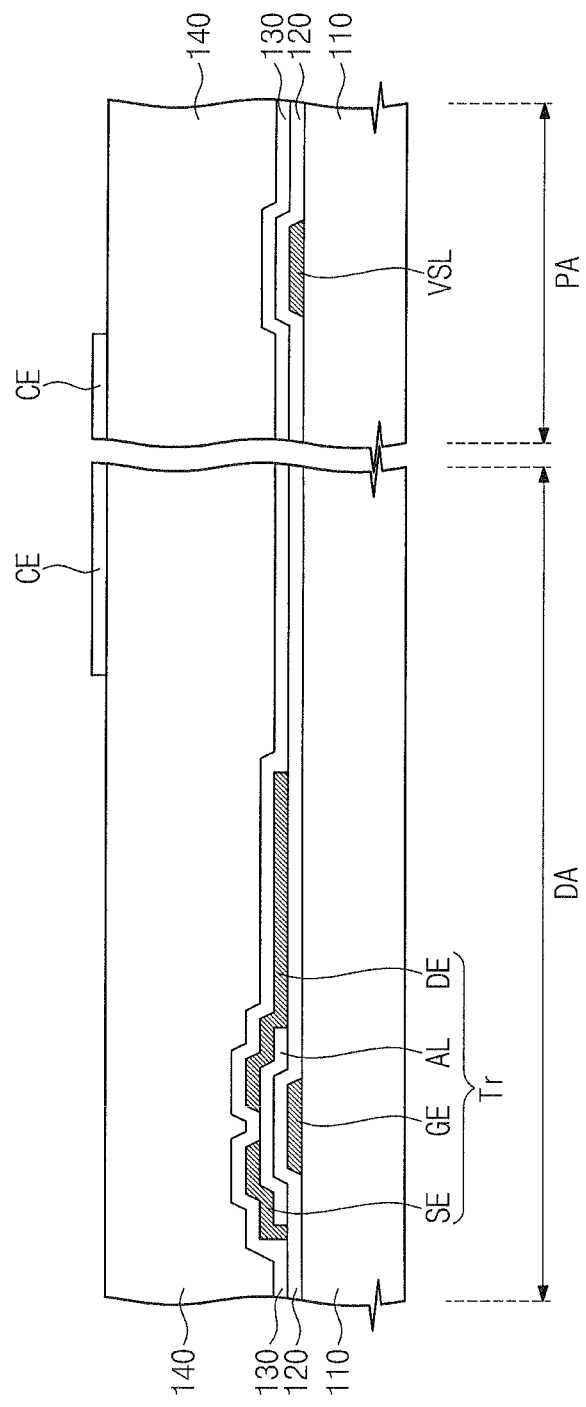

Referring to FIG. 6F, a first transparent conductive layer is formed on the organic insulating layer 140. The first transparent conductive layer includes a transparent conductive material, such as indium tin oxide. The first transparent conductive layer is patterned to form the reference electrode CE on the organic insulating layer 140. The reference electrode CE is disposed adjacent to the reference voltage supply line VSL in the peripheral area PA.

Figure 6G:
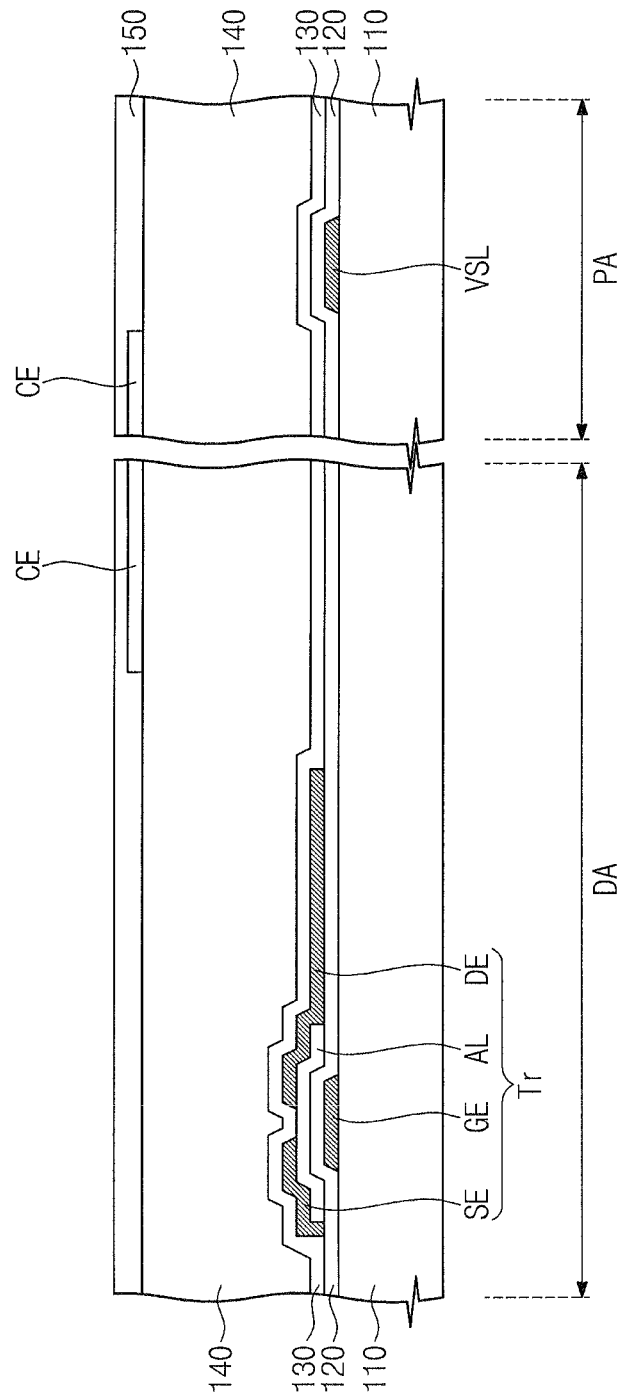

Referring to FIG. 6G, the reference electrode CE is covered by the second protection layer 150. The second protection layer 150 is formed of the inorganic insulating material, such as silicon nitride (SiNx) or silicon oxide (SiOx).

Referring to FIG. 6H, a second transparent conductive layer is formed on the second protection layer 150. The second transparent conductive layer includes a transparent conductive material, such as indium tin oxide. The second transparent conductive layer is patterned to form a first electrode pattern 171 on the second protection layer 150. As shown in FIG. 6H, a first opening 171a, a second opening 171b, and a third opening 171c are formed through the first electrode pattern 171 by the patterning process to expose the second protection layer 150.

Figure 6I:
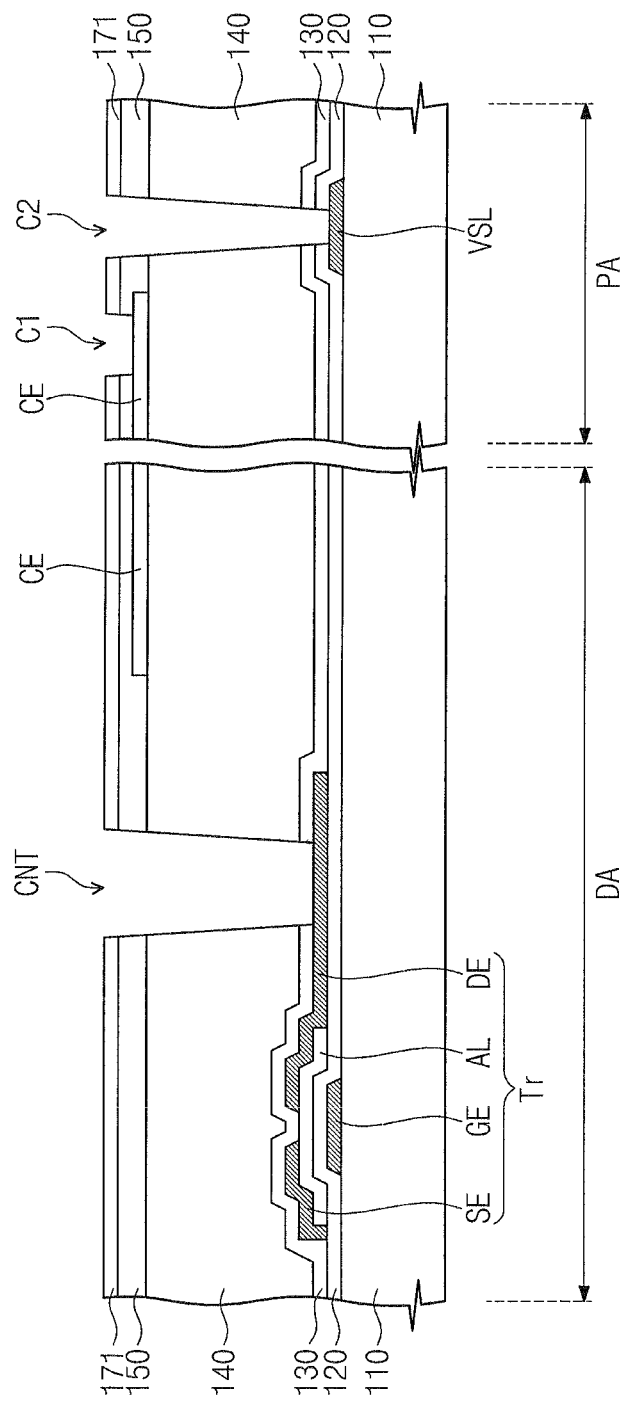

Then, as shown in FIG. 6I, portions of the second protection layer 150, the organic insulating layer 140, the first protection layer 130, and the gate insulating layer 120 are dry-etched using the first electrode pattern 171 as a hard mask in each of the first, second, and third openings 171a, 171b, and 171c. As a result, the contact hole CNT, which exposes the drain electrode DE, is formed in an area corresponding to the first opening 171a in each pixel PX of the display area DA. In addition, a first via hole C1 and a second via hole C2 are formed in areas respectively corresponding to the second opening 171b and the third opening 171c to expose the reference electrode CE and the reference voltage supply line VSL in the peripheral area PA.

As described above, when the organic insulating layer 140 is patterned by the dry etching process using the first electrode pattern 171 as the mask, a diameter of the contact hole CNT may be precisely controlled. For example, as the size of the contact hole CNT increases, an aperture ratio is reduced. However, since the diameter of the contact hole CNT can be prevented from increasing due to using the first electrode pattern 171 as a mask, the size of the contact hole CNT can be made small. Thus, the aperture ratio of the liquid crystal display 1000 can be improved, and a transmittance of the liquid crystal display 1000 can be enhanced.

Figure 6J:
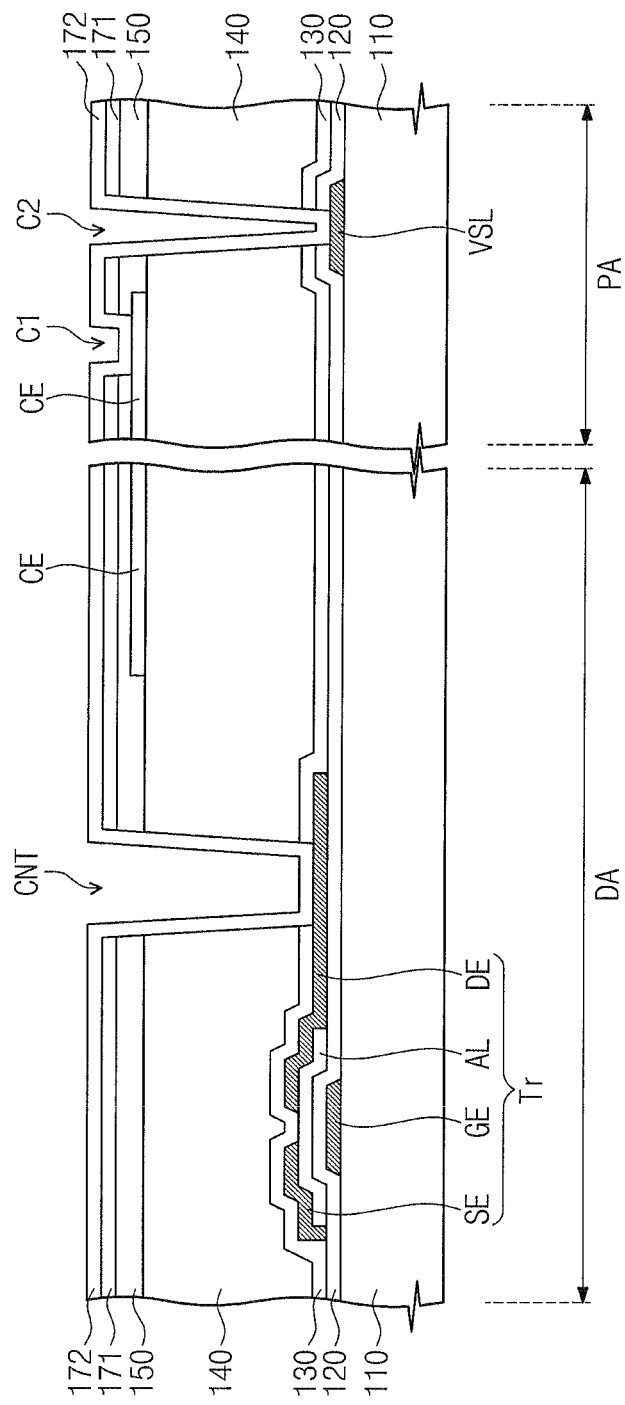

Referring to FIG. 6J, the first electrode pattern 171, the drain electrode DE exposed through the contact hole CNT, the reference electrode CE exposed through the first via hole C1, and the reference voltage supply line VSL exposed through the second via hole C2 are covered by a third transparent conductive layer 172. The third transparent conductive layer 172 is formed of a transparent conductive material, such as indium tin oxide.

Figure 6K:
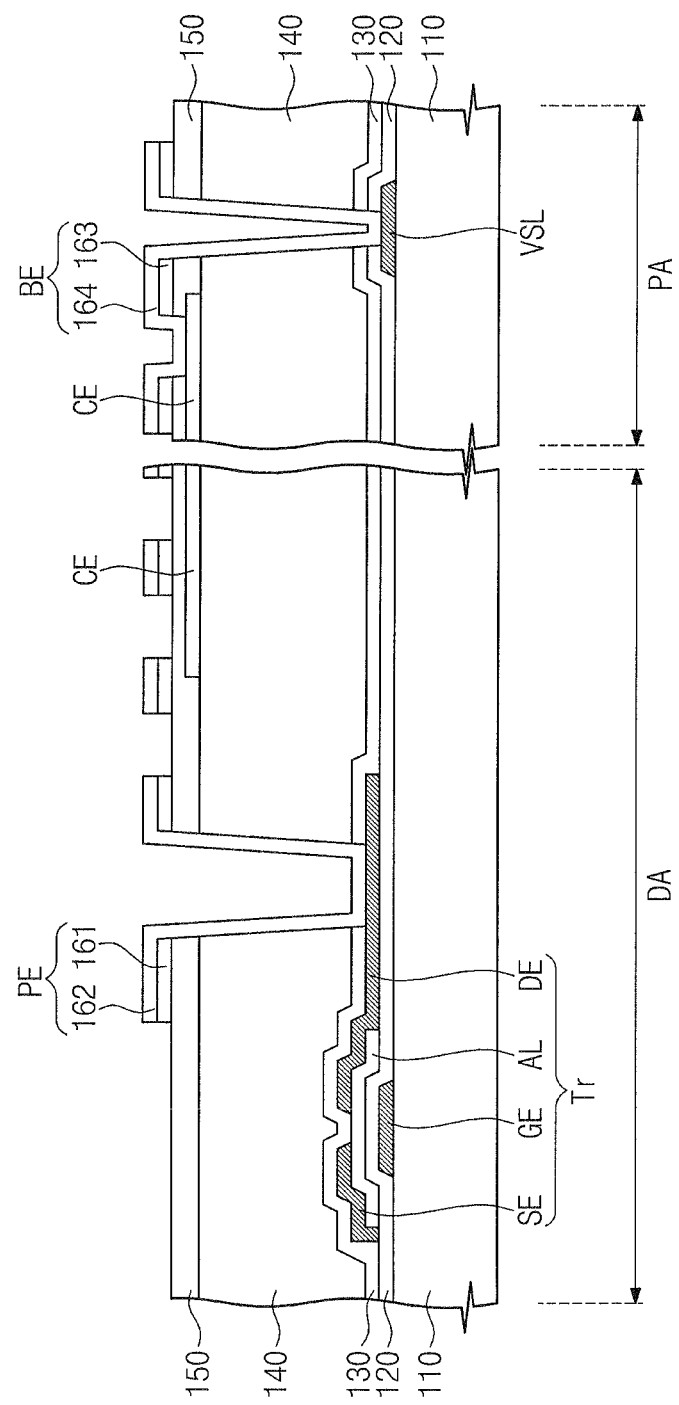

As shown in FIG. 6K, the first electrode pattern 171 and the third transparent conductive layer 172 are substantially simultaneously patterned to form the pixel electrode PE in the display area DA and to form a bridge electrode BE in the peripheral area PA.

In detail, the pixel electrode PE has the double-layered structure on the second protection layer 150. The pixel electrode PE includes the first pixel electrode 161 disposed on the second protection layer 150 and the second pixel electrode 162 disposed on the first pixel electrode 161.

Referring to FIG. 6K, since the second pixel electrode 162 makes direct contact with the drain electrode DE through the contact hole CNT, the pixel electrode PE is electrically connected to the drain electrode DE.

As described above, the pixel electrode PE has the double-layered structure except for the area where the contact hole CNT is formed, and thus conductivity of the pixel electrode PE may be improved.

In addition, since the first electrode pattern 171, which is used as the mask for the etching process to form the contact hole CNT, serves as the lower layer of the pixel electrode PE, a process used to remove the etching mask is not necessary, thereby decreasing the number of manufacturing processes of the first substrate 100.

As further shown in FIG. 6K, the bridge electrode BE is formed in the peripheral area PA to electrically connect the reference electrode CE and the reference voltage supply line VSL. Similar to the pixel electrode PE, the bridge electrode BE has the double-layered structure. However, the bridge electrode BE has a single-layered structure in the areas where the first and second via holes C1 and C2 are formed.

In other words, the bridge electrode BE has the double-layered structure on the second protection layer 150. In detail, the bridge electrode BE includes a first bridge electrode 163 disposed on the second protection layer 150 and a second bridge electrode 164 disposed on the first bridge electrode 163. Since the second bridge electrode 164 makes direct contact with the reference electrode CE and the reference voltage supply line VSL through the first and second via holes C1 and C2, the bridge electrode BE may electrically connect the reference electrode CE to the reference voltage supply line VSL.

Although not shown in figures, the organic insulating layer 140 may be removed from the peripheral area PA in which pads, which are extended from individual ends of the data lines D1 to Dm and the gate lines G1 to Gn, are formed.

Figure 7:
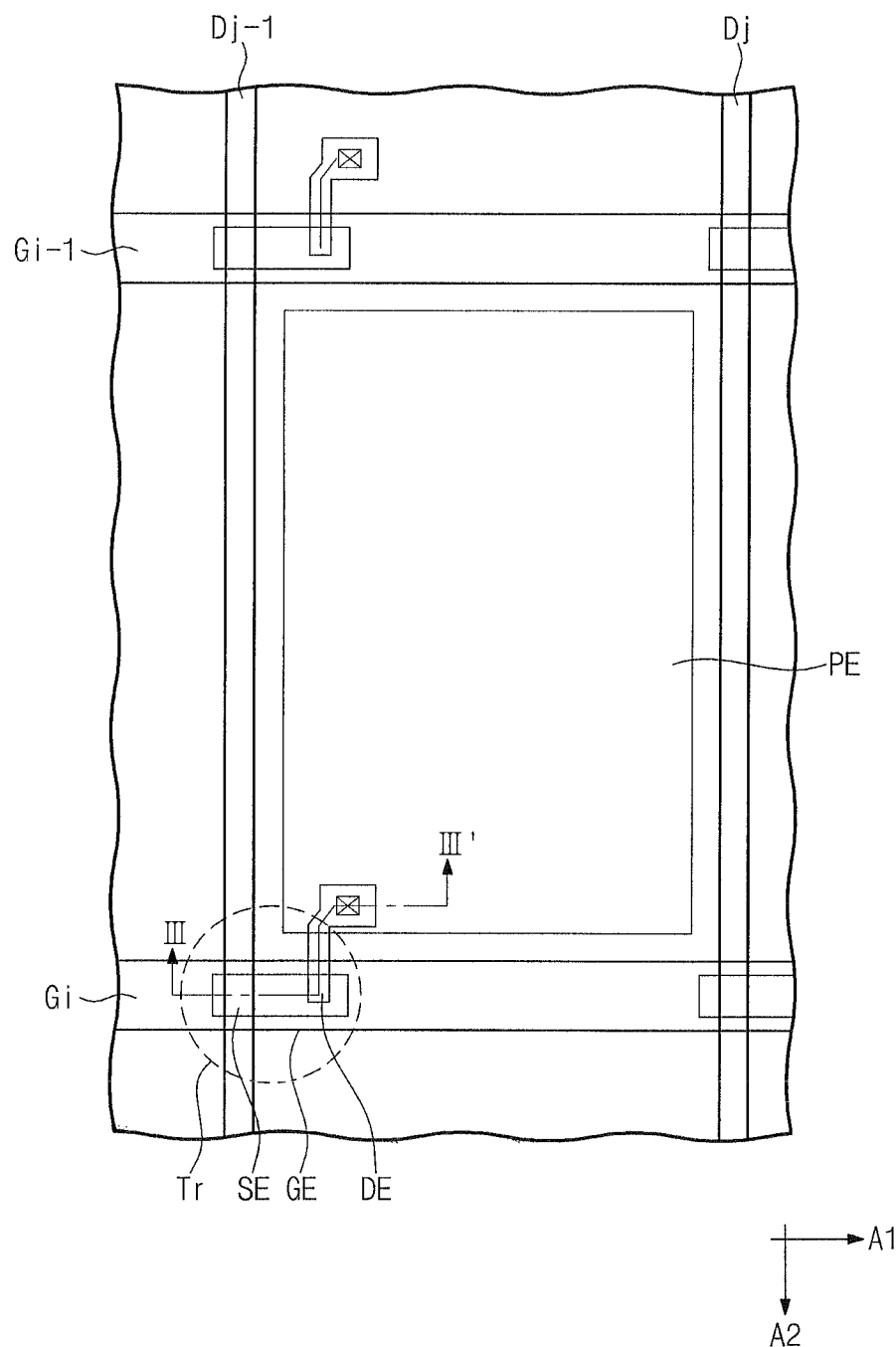
FIG. 7 is a plan view showing a liquid crystal display panel according to an exemplary embodiment of the present invention.
Figure 8:
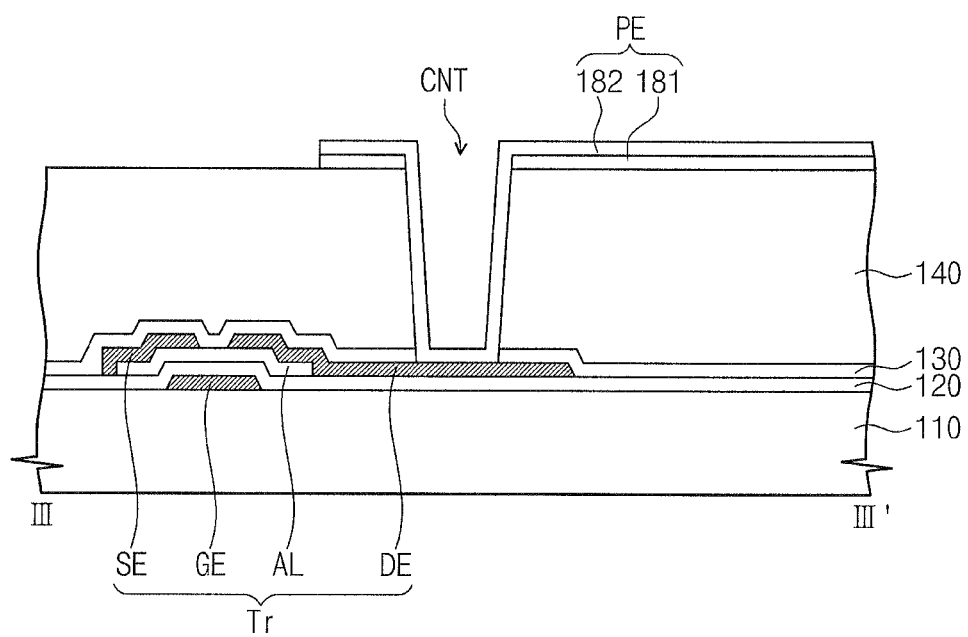
FIG. 8 is a cross-sectional view taken along line III-III' of FIG. 7

FIG. 7 is a plan view showing a liquid crystal display panel according to an exemplary embodiment of the present invention, and FIG. 8 is a cross-sectional view taken along line of FIG. 7. In FIGS. 7 and 8, the liquid crystal display panel includes a reference electrode CE disposed on a second substrate 200 (not shown) and a pixel electrode PE disposed on a first substrate 100, and thus the liquid crystal display panel is operated in a vertical electric field mode. For convenience of explanation, FIGS. 7 and 8 respectively show the plan view and the cross-sectional view of the first substrate 100.

Referring to FIGS. 7 and 8, the first substrate 100 according to an exemplary embodiment of the present invention includes a first insulating substrate 110 formed of a transparent glass or plastic and a first gate line Gi-1, a second gate line Gi, a first data line Dj-1, and a second data line Dj, which are disposed on the first insulating substrate 110.

The first and second gate lines Gi-1 and Gi are extended in a first direction A1 and arranged in a second direction A2 substantially perpendicular to the first direction A1 while being spaced apart from each other by a predetermined distance. The first and second data lines Dj-1 and Dj are extended in the second direction A2 and spaced apart from each other by a predetermined distance.

The first and second gate lines Gi-1 and Gi are electrically insulated from the first and second data lines Dj-1 and Dj by a gate insulating layer 120. In addition, the first and second data lines Dj-1 and Dj are covered by a first protection layer 130. As an example, the first protection layer 130 includes an inorganic insulating layer. An organic insulating layer 140 is disposed on the first protection layer 130.

The pixel electrode PE is disposed on the organic insulating layer 140. The pixel electrode PE has a double-layered structure on the organic insulating layer 140. In detail, the pixel electrode PE includes a first pixel electrode 181 disposed on the organic insulating layer 140 and a second pixel electrode 182 disposed on the first pixel electrode 181.

As shown in FIG. 8, the second pixel electrode 182 makes direct contact with the drain electrode DE through the contact hole CNT, and thus the pixel electrode PE is electrically connected to the drain electrode DE.

As described above, the pixel electrode PE has the double-layered structure except for the area in which the contact hole CNT is formed, so that the conductivity of the pixel electrode PE is improved.

In addition, since the first pixel electrode 181, which is used as an etching mask to form the contact hole CNT, remains as the lower layer of the pixel electrode PE, a process used to remove the etching mask is not necessary, thereby decreasing the number of manufacturing processes of the first substrate 100.

As a result, in the liquid crystal display 1000 operated in the vertical electric field mode, the size of the contact hole CNT may be made and kept small by the dry etching process, and thus an aperture ratio and transmittance of the liquid crystal display 1000 may be improved.

While the present invention has been shown and described with reference to exemplary embodiments thereof, it will be apparent to those of ordinary skill in the art that various changes in form and detail may be made thereto without departing from the scope and spirit of the invention as defined by the following claims.

What is claimed is:

1. A liquid crystal display, comprising:
 a first substrate including a plurality of pixels, at least one of the pixels comprising:
 a thin film transistor disposed on a first insulating substrate;
 an insulating layer overlapping the thin film transistor; and
 a pixel electrode disposed on the insulating layer and comprising a first pixel electrode and a second pixel electrode, wherein a contact hole is formed through the insulating layer to expose a first electrode of the thin film transistor, the pixel electrode is electrically connected to the first electrode through the contact hole, the first pixel electrode is disposed on the insulating layer except an area where the contact hole is formed, and the second pixel electrode is disposed on the first pixel electrode and the area where the contact hole is formed, and wherein the first pixel electrode includes an opening in the area where the contact hole is formed.

2. The liquid crystal display of claim 1, wherein the second pixel electrode is directly connected to the first electrode through the contact hole.

3. The liquid crystal display of claim 1, wherein the first and second pixel electrodes comprise a transparent conductive material.

4. The liquid crystal display of claim 1, wherein the insulating layer comprises an organic insulating layer.

5. The liquid crystal display of claim 1, wherein the insulating layer comprises a color filter.

6. The liquid crystal display of claim 1, further comprising:
a second substrate facing the first substrate; and
a liquid crystal layer interposed between the first substrate and the second substrate.

7. A liquid crystal display, comprising:
a first substrate including a plurality of pixels, at least one of the pixels comprising:
a thin film transistor disposed on a first insulating substrate;
a first protection layer overlapping the thin film transistor;
an insulating layer disposed on the first protection layer;
a reference electrode disposed on the insulating layer;
a second protection layer overlapping the reference electrode; and
a pixel electrode disposed on the second protection layer and comprising a first pixel electrode and a second pixel electrode, wherein a contact hole is formed through the first protection layer, the insulating layer, and the second protection layer to expose a first electrode of the thin film transistor, the pixel electrode is electrically connected to the first electrode through the contact hole, the first pixel electrode is disposed on the second protection layer except an area where the contact hole is formed, and the second pixel electrode is disposed on the first pixel electrode and the area where the contact hole is formed, and wherein the first pixel electrode includes an opening in the area where the contact hole is formed.

8. The liquid crystal display of claim 7, wherein the second pixel electrode is directly connected to the first electrode through the contact hole.

9. The liquid crystal display of claim 7, wherein the first and second pixel electrodes comprise a transparent conductive material.

10. The liquid crystal display of claim 7, wherein the reference electrode is configured to receive a reference voltage.

11. The liquid crystal display of claim 7, further comprising:
a second substrate facing the first substrate; and
a liquid crystal layer interposed between the first substrate and the second substrate.

12. A method of manufacturing a liquid crystal display, comprising:
forming a first substrate, wherein the forming of the first substrate comprises:
forming a thin film transistor on a first insulating substrate;
forming an insulating layer over the thin film transistor;
forming a first pixel electrode with an opening on the insulating layer;
etching the insulating layer using the first pixel electrode as a mask to form a contact hole corresponding to the opening; and
forming a second pixel electrode on the first pixel electrode, wherein the second pixel electrode is electrically connected to an electrode of the thin film transistor through the contact hole.

13. The method of claim 12, wherein the contact hole is formed through a dry-etching process.

14. The method of claim 13, wherein the first and second pixel electrodes comprise a transparent conductive material.

15. The method of claim 12, wherein the insulating layer comprises an organic insulating layer.

16. The method of claim 12, further comprising:
forming a second substrate facing the first substrate; and
forming a liquid crystal layer between the first and second substrates.

17. A method of manufacturing a liquid crystal display, comprising:
forming a first substrate, wherein the forming of the first substrate comprises:
forming a thin film transistor on a first insulating substrate;
forming a first protection layer over the thin film transistor;
forming an insulating layer on the first protection layer;
forming a reference electrode on the insulating layer;
forming a second protection layer over the reference electrode;
forming a first pixel electrode with an opening on the second protection layer;
etching the second protection layer, the insulating layer, and the first protection layer using the first pixel electrode as a mask to form a contact hole through an area corresponding to the opening; and
forming a second pixel electrode on the first pixel electrode, wherein the second pixel electrode is electrically connected to an electrode of the thin film transistor through the contact hole.

18. The method of claim 17, wherein the contact hole is formed through a dry-etching process.

19. The method of claim 18, wherein the first and second pixel electrodes comprise a transparent conductive material.

20. The method of claim 17, wherein the insulating layer comprises an organic insulating layer.

21. The method of claim 17, further comprising:
forming a second substrate facing the first substrate; and
forming a liquid crystal layer between the first and second substrates.

* * * * *